「US008145541B2」

United States Patent
Mohan

(10) Patent No.: US 8,145,541 B2
(45) Date of Patent: Mar. 27, 2012

(54) MERCHANDISING FOR HIGHER BIDS

(75) Inventor: Sunil Mohan, Los Gatos, CA (US)

(73) Assignee: eBay Inc., San Jose, CA (US)

( * ) Notice: Subject to any disclaimer, the term of this patent is extended or adjusted under 35 U.S.C. 154(b) by 1131 days.

(21) Appl. No.: 11/961,117

(22) Filed: Dec. 20, 2007

(65) Prior Publication Data

US 2009/0164358 A1    Jun. 25, 2009

(51) Int. Cl.
*G06Q 30/00* (2006.01)

(52) U.S. Cl. ..................... 705/26.64; 705/26.1

(58) Field of Classification Search ............... 705/26, 705/26.1, 26.3, 26.4
See application file for complete search history.

(56) References Cited

U.S. PATENT DOCUMENTS

| | | | |
|---|---|---|---|
| 6,715,130 B1 * | 3/2004 | Eiche et al. .................... | 715/210 |
| 7,577,582 B1 * | 8/2009 | Ojha et al. .................... | 705/26.3 |
| 2002/0107861 A1 * | 8/2002 | Clendinning et al. ........ | 707/101 |
| 2003/0083949 A1 * | 5/2003 | Kar ................................ | 705/26 |
| 2003/0208399 A1 * | 11/2003 | Basak et al. .................... | 705/14 |
| 2004/0215527 A1 * | 10/2004 | Grove et al. .................... | 705/26 |
| 2008/0046343 A1 * | 2/2008 | Maguire et al. ................ | 705/27 |
| 2008/0091546 A1 * | 4/2008 | Kirovski et al. ............... | 705/26 |
| 2008/0091548 A1 * | 4/2008 | Kotas et al. .................... | 705/26 |
| 2008/0154761 A1 * | 6/2008 | Flake et al. .................... | 705/37 |

* cited by examiner

*Primary Examiner* — Amee A Shah
(74) *Attorney, Agent, or Firm* — Schwegman, Lundberg & Woessner, P.A.

(57) ABSTRACT

A method and a system facilitate merchandising for higher bids. In example embodiments, a proposed price for a first listing may be received from a user. In response to receiving of the proposed price, a message may be conveyed to the user when the proposed price is lower than an expected price for the first listing. In supporting the message, the user may be provided with price and popularity information related to one or more second listings similar to the first listing.

20 Claims, 9 Drawing Sheets

Listing Title = " Apple Ipod Nano"
Category = Consumer Electronics

600

| Word | Word Weight | Category Weight | Total Weight |
|------|-------------|-----------------|--------------|
| *Apple* | 5 | 3 | 13 |
| *Ipod* | 3 | | |
| *Nano* | 2 | | |

610 620 630 640

650

| Other Listing Titles | Total Weight |
|----------------------|--------------|
| *New Apple Ipod Nano* | 2+5+3+2+3= 15 |
| *New Apple Ipod Shuffle* | 2+5+3+3+1= 14 |
| *New Ipod Nano* | 2+3+2+3= 10 |
| *Ipod Nano* | 3+2+3= 8 |

MERCHANDISING FOR HIGHER BIDS

TECHNICAL FIELD

Example embodiments relate generally to the technical field of data communication, and in one specific example, to merchandising for higher bids.

BACKGROUND

With the advent of online auctioning pioneered by EBAY INC. of San Jose Calif., the assignee of the present invention, more and more Internet users are realizing the ease and convenience of buying items online. As the leading person-to-person trading site, buyers are compelled to trade on EBAY's web site due to the large amount of content available. Similarly, sellers are attracted to EBAY to conduct business where there are the most buyers. EBAY provides a platform where buyers and sellers may anonymously communicate with each other and EBAY may also communicate with buyers and sellers to enhance merchandizing of published listings.

BRIEF DESCRIPTION OF THE DRAWINGS

Some embodiments are illustrated by way of example and not limitation in the figures of the accompanying drawings in which:

FIG. 6 is a diagram illustrating, in an example embodiment, a numerical representation of the algorithm of FIG. 5;

DETAILED DESCRIPTION

Example methods and systems for merchandising for higher bids have been described. In the following description, for purposes of explanation, numerous specific details are set forth to provide a thorough understanding of example embodiments. It will be evident, however, to one skilled in the art that the present disclosed technology may be practiced without these specific details.

Some embodiments described herein may include a computerized method for merchandizing for higher bids. In example embodiments, a proposed price for a first listing may be received from a user. In response to receiving of the proposed price, a message may be conveyed to the user when the proposed price is lower than an expected price for the first listing. In supporting the message, the user may be provided with price and popularity information related to one or more second listings similar to the first listing.

Figure 1:
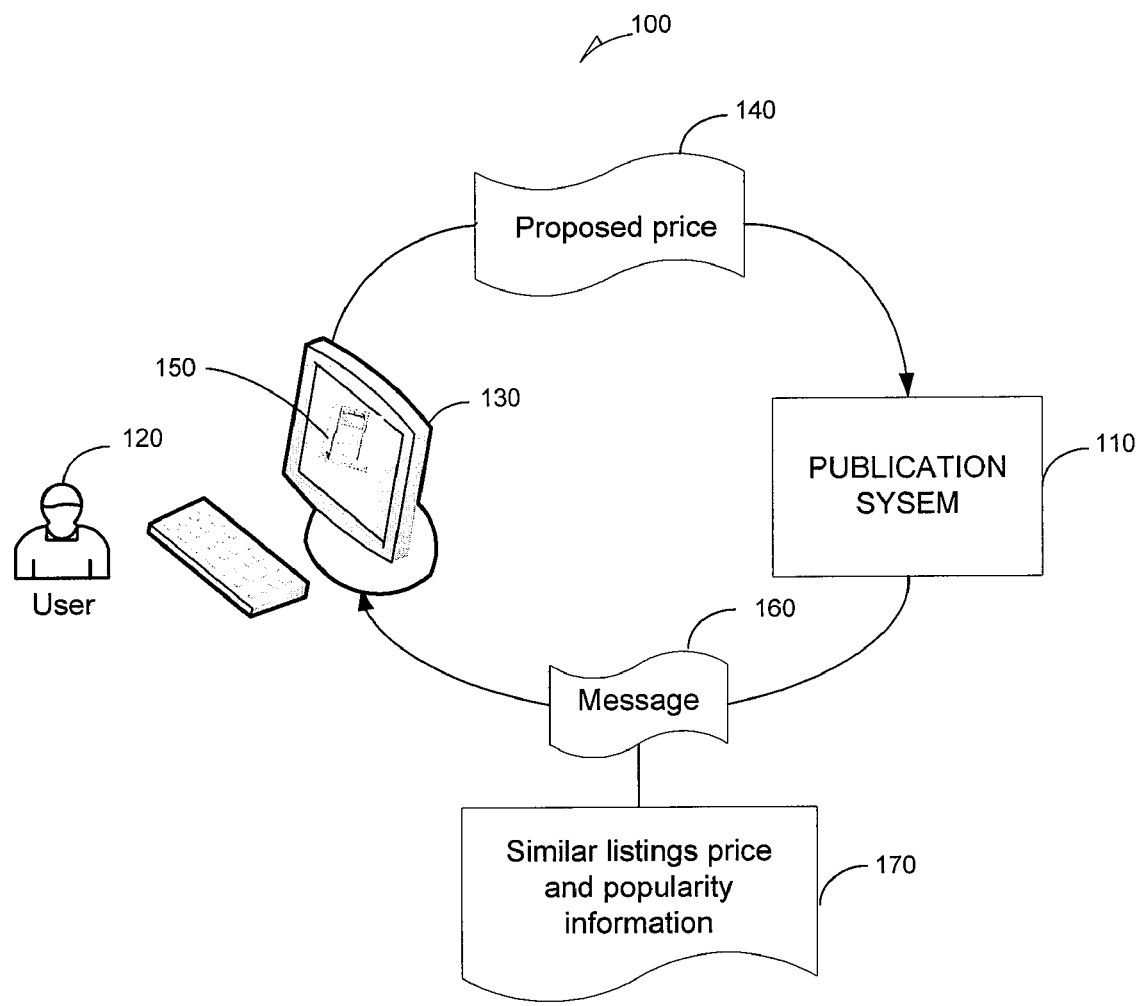
FIG. 1 is a high-level diagram illustrating, in an example embodiment, functionality of a system for merchandising for higher bids.

FIG. 1 is a high-level diagram illustrating, in an example embodiment, functionality of a system 100 for merchandising for higher bids. The publication system 110 may receive a proposed price 140 (e.g. a bid) for a first listing 150 (e.g., an item such as an IPHONE, manufactured by APPLE COPRPORATION of Cupertino, Calif.), published by the publication system 110 (e.g., EBAY Inc. of San Jose Calif.) from a user 120 using a client machine 130 (e.g., a desktop computer, a laptop, a tablet PC, a Personal Digital Assistant (PDA), a cell phone, etc.) linked to the publication system 110 via a network (e.g., the Internet).

According to an example embodiment, in case the proposed price is less than an expected price for the first listing 150, in order to persuade the user 120 to propose a higher price, the publication system 110 may convey a message 160 to the user 120 when the proposed price 140 is lower than an expected price for the first listing 150. The publication system 110 may support the message 160 by providing the user 120 with price and popularity information 170 (e.g., a number of sold listings or a number of bids in a closed auction or a number of bids in an active auction) related to one or more second listings similar to the first listing 150. The user 120, receiving the message 160, may include a bidder in an active auction, a potential bidder in an active auction, or a losing bidder in a closed auction Example embodiments may include receiving, by the publication system 110, of a proposed price 140 including a current highest bid price in an active auction for the first listing 150. The current highest bid price may, by definition, be higher than other bid prices in the active auction for the first listing 150.

In example embodiments, the publication system 110 may determine the expected price for the first listing 150 based on a sold price of one or more second listings similar to the first listing 150. The publication system 110 may provide the user with one or more prices including a sold price in a closed auction, or a current bid price in an active auction, of the second listing similar to the first listing 150.

Figure 2:
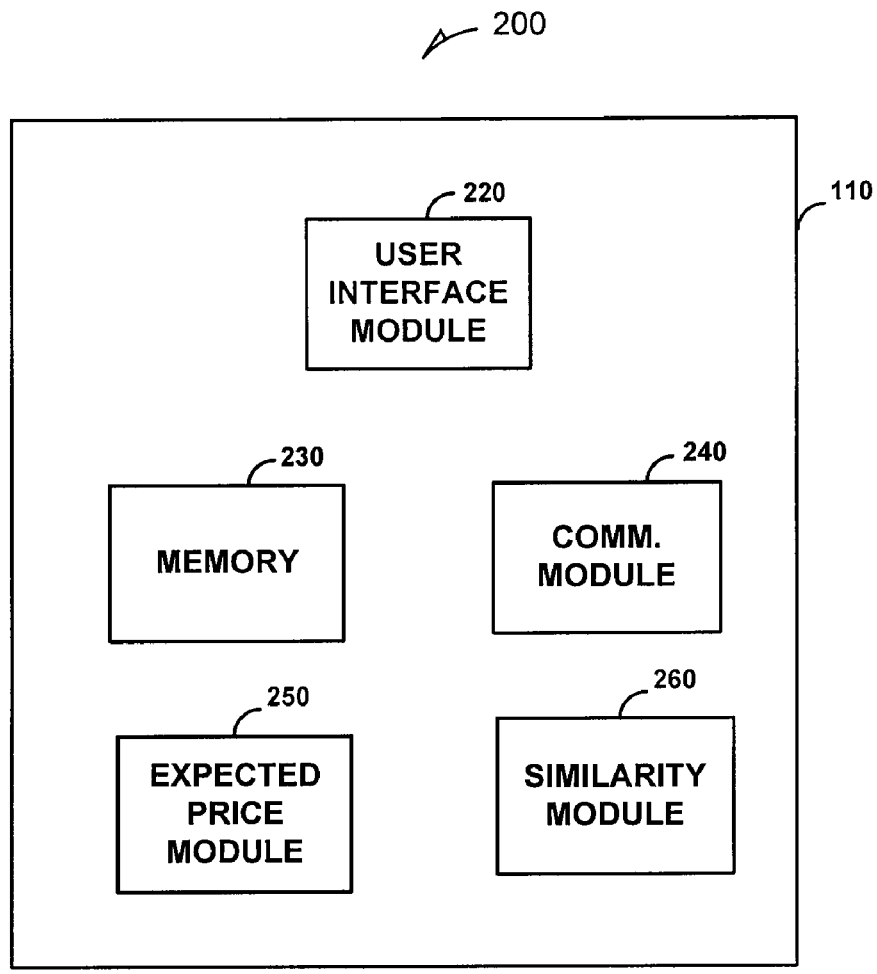
FIG. 2 is a block diagram illustrating, in an example embodiment, a merchandising for higher bids system.
Figure 2:
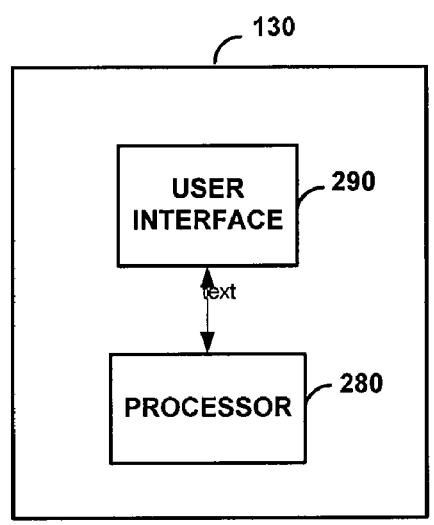

FIG. 2 is a block diagram illustrating, in an example embodiment, a system 200 for implementation of merchandising for higher bids. The system 200 may include a publication system 110 and a client machine 130 coupled via a network (e.g., the Internet). The publication system 110 may include a user interface module 220, a communication module 240, a memory 230, a similarity module 260, and an expected price module 250.

According to an example embodiment, the user interface module 220 may receive a proposed price 140 for a first listing 150 from a user 120. The expected price module 250 may determine that the proposed price 140 is less than an expected price for the first listing 150. The expected price module 250 may determine the expected price based on sold prices of one or more other listings similar to the first listing. The expected price module 250 may obtain the sold price of the one or more other listing similar to the first listing from the memory 230.

In example embodiments, the expected price module 250 may calculate the expected price of the first listing 150 by averaging the sold price of second listings similar to the first listing 150. The expected price module may also take a minimum/maximum price of the similar listings as the expected price for the first listing 150 or may use other statistical measures such as percentile or mode to obtain the expected price for the first listing 150.

In an example embodiment, the similarity of the listings may be decided by the similarity module 260. The similarity module 260 may use an algorithm (see description under FIGS. 5 and 6) to decide whether one or more second listings are similar to the first listing 150.

Returning to receiving of the proposed price 140 from the user 120, the communication module 240 may respond by conveying the message 160 to the user 120, when the proposed price 140 is lower than the expected price, determined by the expected price module 250, for the first listing 150. In order to persuade the user 120 to propose a higher price, the communication module 240 may support the message 160 by communicating to the user 120 price and popularity information related to one or more second listings, published by the publication system 110, that are similar to the first listing 150.

In example embodiments, the communication module 240 may obtain, from the memory 230, price and popularity information 170 related to one or more listings similar to the first listing 150 stored in memory 230. The price information may include sold price in a closed auction or a current bid price in an active auction of the one or more second listings similar to the first listing 150. The popularity information stored by the memory 230 may include a number of second listings similar to the first listing sold in a closed auction or a number of bids for the second listing similar to the first listing 150 in a closed/active auction.

According to an example embodiment, the communication module 240 may communicate the price and popularity information 170 related to the second listing similar to the first listing 150 to the user 120 including a potential bidder/bidder in an active auction, or a losing bidder in a closed auction. The client machine 130 may include a user interface 290 and a processor 280. The user interface 290 may be used by the user 120 to communicate a proposed price 140 for a first listing 150 to the publication system 110. The user 120 may also use the user interface 290 to receive the message 160 from the publication system 110. The processor 280 may support the user 120 in analyzing the information received from the publication system and deciding about a higher proposed price (e.g., by some calculation such as finding an average or a mean price of the one or more similar second listings received from the publication system 110)

Figure 3:
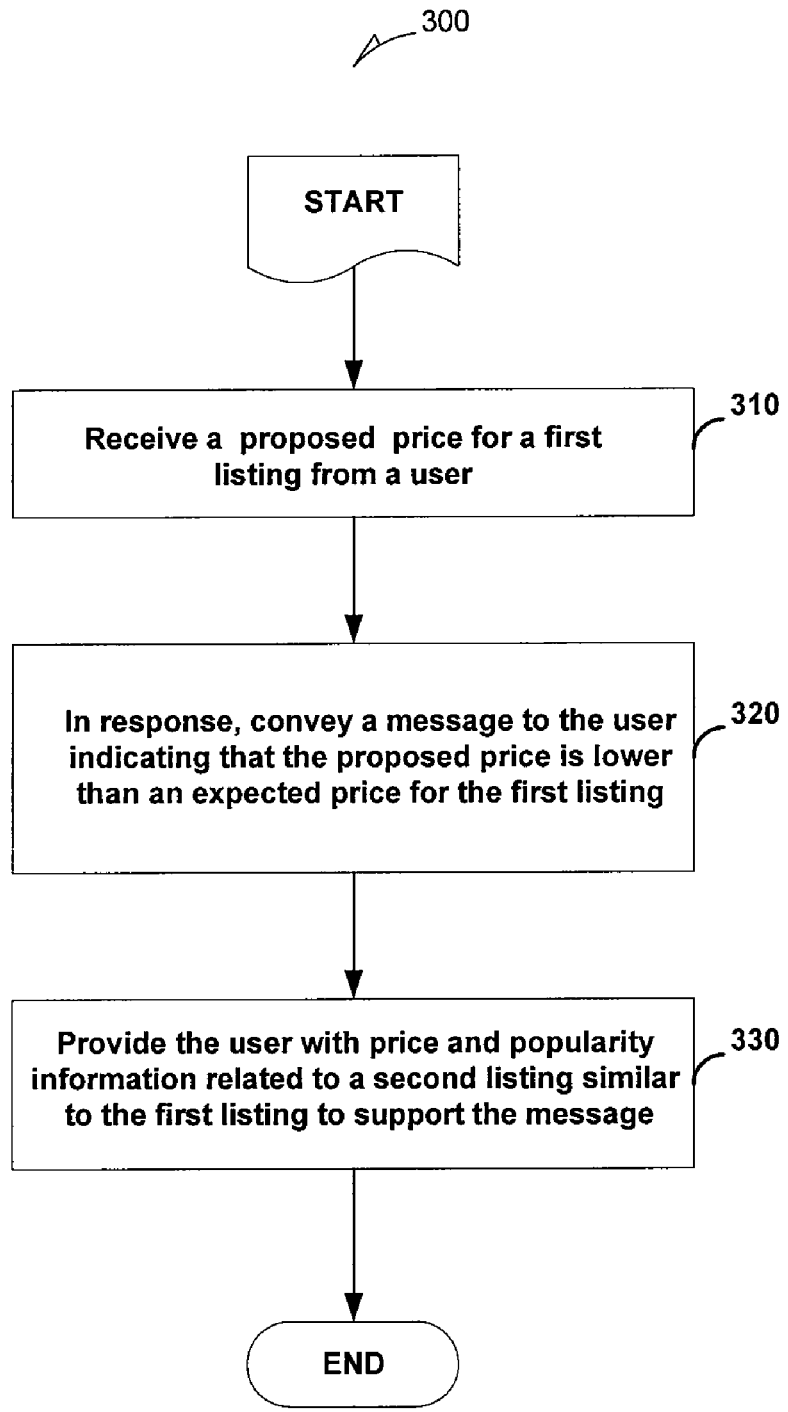
FIG. 3 is a flow diagram illustrating an example embodiment of a method for merchandising for higher bids.

FIG. 3 is a flow diagram illustrating an example embodiment of a method 300 for merchandising for higher bids. The method 300 may start at operation 310, where the user interface module 220 may receive a proposed price 140 for a first listing 150 from a user 120. In response, at operation 320, the communication module 230 may convey a message 160 to the user 120. The message 160 may indicate that the proposed price 140 is lower than an expected price determined by the expected price module 250 for the first listing 150.

According to an example embodiment, the communication module 240, in order to persuade the user 120 to propose a higher proposed price, may support the message 160 by communicating, at operation 330, price and popularity information 170 related to one or more second listings similar to the first listing 150. The similarity between listings may be decided by the similarity module 260.

Figure 4:
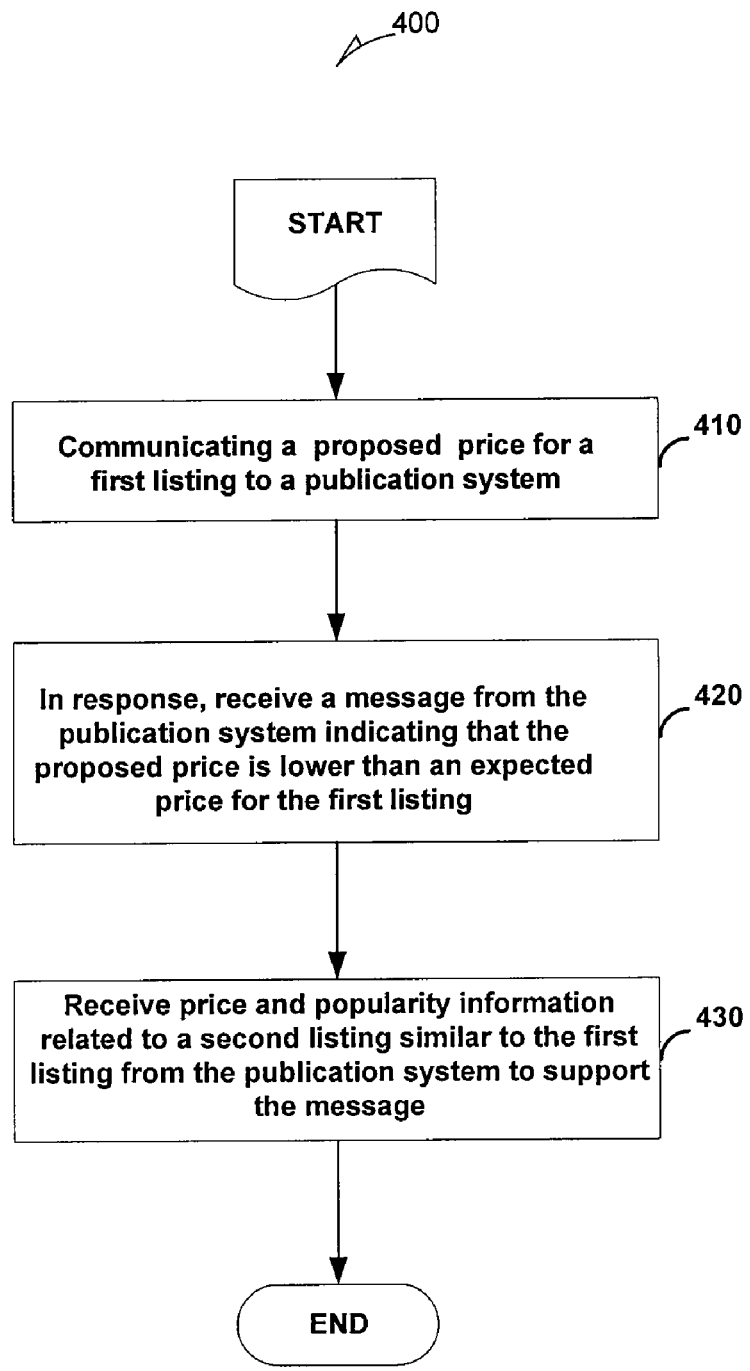
FIG. 4 is a flow diagram illustrating, in another example embodiment, a method for merchandising for higher bids.

FIG. 4 is a flow diagram illustrating, in another example embodiment, a method 400 for merchandising for higher bids. According to the method 400, at operation 410, the user 120 may communicate, via a network, using the user interface 290, a proposed price 140 for a first listing 150 to a publication system 110. In case the proposed price is lower than the expected price for the first listing 150, as determined by the expected price module 250, the user 120 may receive a message 160 from the publication system 110 when the proposed price 140 is lower than the expected price for the first listing 150 (operation 420).

The user 120 may be persuaded to propose a higher price for the first listing 150, after receiving, at operation 430, price and popularity information 170, related to one or more listings similar to the first listing 150, from the publication system in supporting the message 160. In response to receiving the message 160 and the price and popularity information 170, the user 120 may decide to propose a higher price for the first listing 150.

The user 120 may use the processor 280 to calculate an average or a mean price for one or more second listings similar to the first listing 150, based on the price information received from the publication system 110. The similarity between listings may be determined by the similarity module 260, as described before and further explained below in description of FIGS. 5 and 6.

Figure 5:
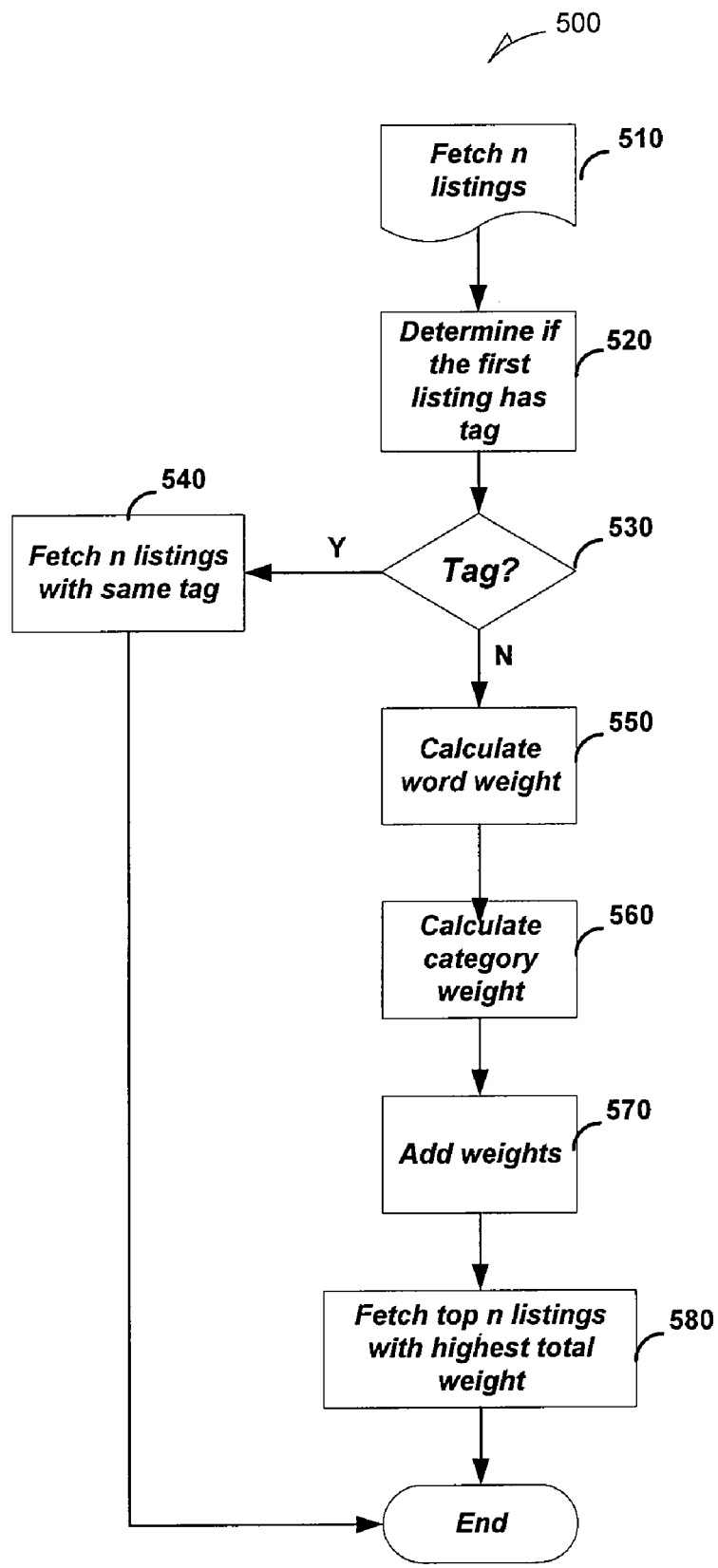
FIG. 5 is a flow diagram illustrating, in an example embodiment, an algorithm for identifying similar listings in a publication system.

FIG. 5 is a flow diagram illustrating, in an example embodiment, an algorithm 500 for identifying similar listings in a publication system. In supporting the publication system 110 to provide price and popularity information 170 related to one or more second listings similar to the first listing 150, the similarity module 260 may use the algorithm 500 described below to obtain second listings that are similar to the first listing 150.

According to example embodiments, at operation 510, the similarity module 260 may decide to fetch from the memory 230 a predefined number N (e.g., 10, 20, 50, etc.) of second listings similar to the first listing 150. The similarity module 260 may determine, at operation 520, whether the first listing 150 has a tag (e.g., a catalog number). At control operation 530, in case the first listing 150 has a tag, the control is passed to the operation 540, where N second listings with the same tags are fetched from the memory 230 and considered as similar to the first listing 150.

However, if the first listing 150 has no tag, at operation 550, the similarity module 260 may calculate a parameter called word weight, based on certain frequencies associated with each of the words in the title of the listing 150 as described below in more detail under description of FIG. 6. At operation 560 another parameter called category weight may be calculated (for details see the discussion under the description of FIG. 6).

In an example embodiment, the similarity module 260 may, at operation 570, add the word weight and the category weight to find a total weight. Then the similarity module 260 may fetch N listings from the memory 240 that are associated with the highest N total weight numbers (operation 580). These top N listings may be considered as the N second listings similar to the first listings 150. According to another example embodiment, the similarity module 260 may also consider other weights, for example, attribute weights related to attributes such as size, color, etc. associated with items listed by a seller or retrieved from the memory 230.

FIG. 6 is a diagram illustrating, in an example embodiment, a numerical representation of the algorithm 500 of FIG. 5. Tables 600 displays, in an example embodiment, a word weight (column 620), a category weight (column 630), and a total weight (column 640), associated with the words "APPLE", "IPOD", and "NANO" (column 610) of a title "APPLE IPOD NANO" for the first listing 150. The first listing APPLE IPOD NANO has no tag, meaning that it is not cataloged, and is listed in the publication system 110 under a category called "Consumer Electronics."

According to an example embodiment, the word weight for the word "APPLE" may be calculated from: Log ((number of active listings)/(number of active listing containing "APPLE" in their title)), where Log stands for base-10 logarithm. For example, if the number of active listings is 10,000,000 and the number of active listings containing "APPLE" in their title is 100, then the word weight for the word "APPLE" would be=Log(10,000,000/100)=Log(100,000)=5.

In an example embodiment, the category weight associated with the category "Consumer Electronics" may be calculated from: Log ((number of active listings)/(number of active listings under the category "Consumer Electronics")). For example, if the total number of active listings is 10,000,000 and the number of active listings under the category "consumer Electronics" is 10,000, then the category weight for the category "consumer Electronics" would be=Log (10,000,000)/(10,000)=Log(1000)=3.

According to the above calculation the total weight for the listing entitled "Apple IPod Nano" would be: total weight=total word weight+category weight=(5+3+2)+3=13. Table 650 displays the total weight (column 660) for some other example listings in the publication system 110, with their titles listed in column 650. The numbers in column 660 are calculated based on the word weights and category weights associated with the word content and the category of individual titles. Based on the algorithm 500 and the results shown in table 650, for example, the top 3 listings that are most similar to the first listing APPLE IPOD NANO would be new APPLE IPOD NANO, new APPLE IPOD SHUFFLE, and new IPOD NANO. Accordingly, the expected price module 250 may use the prices of these listings to calculate the expected price for the first listing APPLE IPOD NANO.

Figure 7:
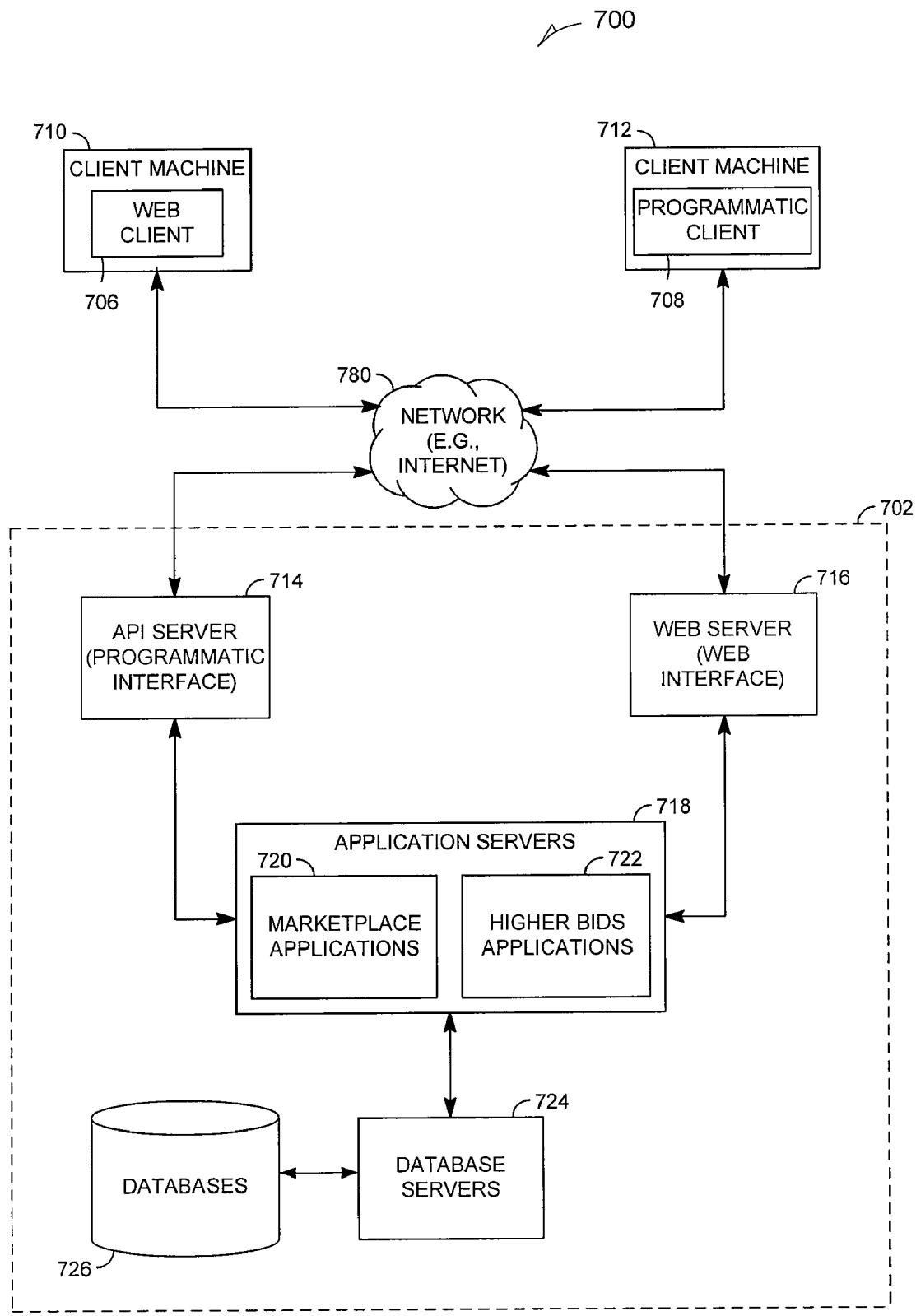
FIG. 7 is high level block diagram illustrating an example network-based embodiment of a merchandising for higher bids system.

FIG. 7 is high-level block diagram illustrating an example network-based publication system 700, having a client-server architecture for facilitating merchandising for higher bids. The network-based publication system 700, in the example form of a network-based merchandising for higher bids system 702, provides server-side functionality, via a network 780 (e.g., the Internet) to one or more clients. FIG. 7 illustrates, for example, a Web client 706 (e.g., a browser, such as the INTERNET EXPLORER browser developed by MICROSOFT CORPORATION of Redmond, Wash.), and a programmatic client 708 executing on respective client machines 710 and 712.

Turning to the network-based merchandising for higher bids system 702, an Application Program Interface (API) server 714 and a Web server 716 are coupled to, and provide programmatic and Web interfaces respectively to, one or more application servers 718. The application servers 718 host one or more marketplace applications 720 and higher bid applications 722. The application servers 718 are, in turn, shown to be coupled to one or more database servers 724 that facilitate access to one or more databases 726.

The marketplace applications 720 provide a number of marketplace functions and services to users who access the network-based publication system 700. The higher bids applications 722 support merchandising for higher bids through providing a bidder with an expected price and price and popularity information related to one or more listings similar to the listings of interest to the bidder, over the network 780.

Further, while the network-based publication system 700 shown in FIG. 7 employs a client-server architecture, the present application is of course not limited to such an architecture and could equally well find application in a distributed, or peer-to-peer, architecture system. The various marketplace and higher bids applications 720 and 722 may also be implemented as standalone software programs, which do not necessarily have networking capabilities.

It should be appreciated that the Web client 706 may access the various marketplace and higher bids applications 720 and 722 via the Web interface supported by the Web server 716. Similarly, the programmatic client 708 accesses the various services and functions provided by the marketplace and higher bids applications 720 and 722 via the programmatic interface provided by the API server 714. The programmatic client 708 may, for example, support affiliate registration applications to provide interested users (e.g., affiliates of the publication system) with affiliate program registration forms to sign up for a publication system's affiliate program. The programmatic client 708 may also include communication applications to perform batch-mode communications between the programmatic client 708 and the network-based merchandising for higher bids system 702.

Figure 8:
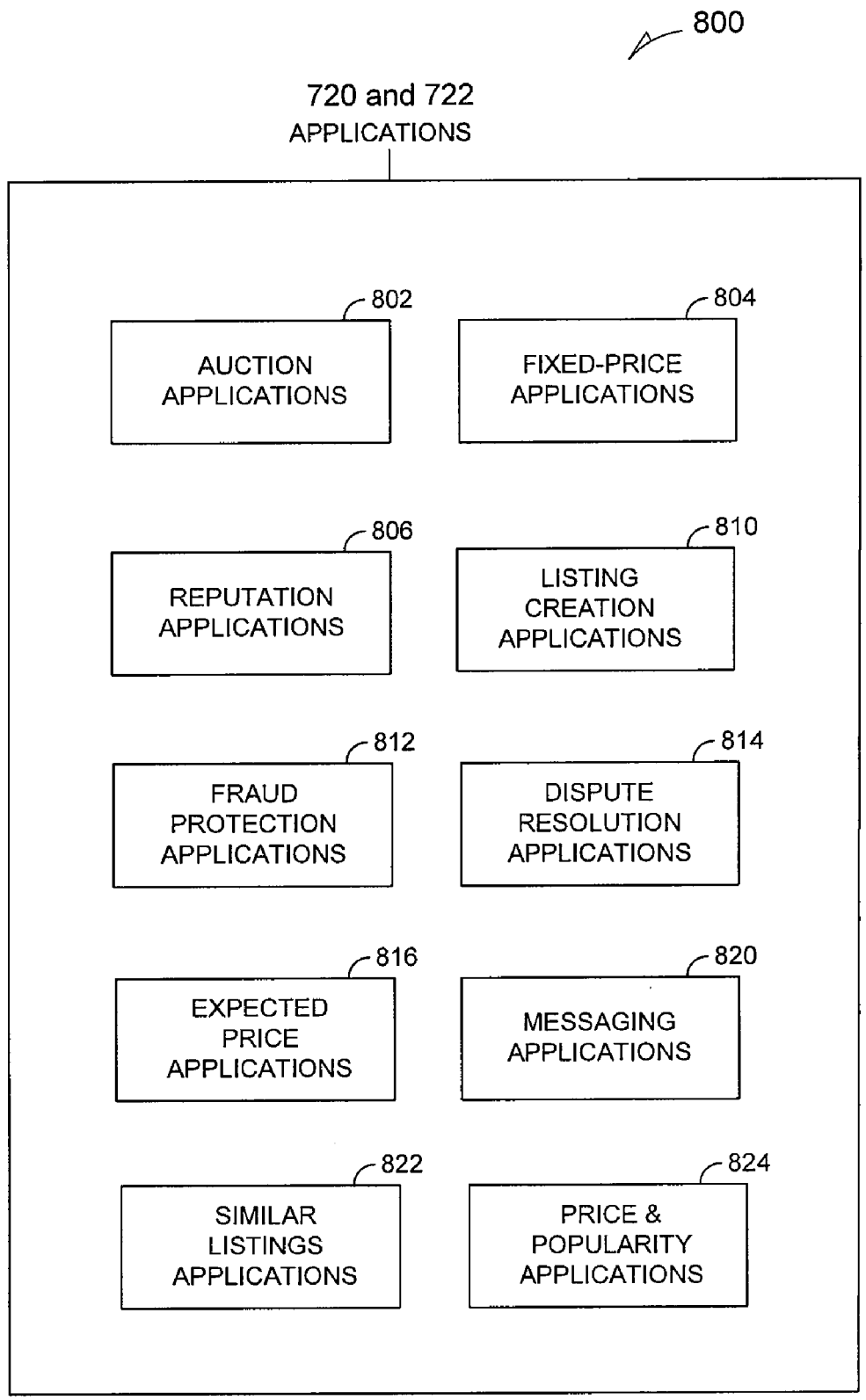
FIG. 8 shows an example set of applications used by the network-based merchandising for higher bids system of FIG. 7.

FIG. 8 shows an example set of merchandising for higher bids applications 800 used by the network-based publication system of FIG. 7. The network-based publication system 700 may provide a number of listing and price-setting mechanisms whereby a seller may list goods or services for sale, a buyer can express interest in or indicate a desire to purchase such goods or services, and a price can be set for a transaction pertaining to the goods or services. The merchandising for higher bids applications 800 are shown to include one or more auction applications 802 that support auction-format listing and price setting mechanisms (e.g., English, Dutch, Vickrey, Chinese, Double, Reverse auctions etc.).

The various auction applications 802 may also provide a number of features in support of such auction-format listings, such as a reserve price feature whereby a seller may specify a reserve price in connection with a listing and a proxy-bidding feature whereby a bidder may invoke automated proxy bidding. A number of fixed-price applications 804 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with an auction-format listing and allow a buyer to purchase goods or services, which are also being offered for sale via an auction, for a fixed-price that is typically higher than the starting price of the auction.

Reputation applications 806 allow parties that transact using the network-based marketplace to establish, build, and maintain reputations, which may be made available and published to potential trading partners. Consider that where, for example, the network-based publication system 700 supports person-to-person trading, users may have no history or other reference information whereby the trustworthiness and credibility of potential trading partners may be assessed. The reputation applications 806 allow a user, for example through feedback provided by other transaction partners, to establish a reputation within the network-based publication system 700 over time. Other potential trading partners may then reference such a reputation for the purposes of assessing credibility and trustworthiness.

Listing creation applications 810 allow sellers conveniently to author listings pertaining to goods or services that they wish to transact via the marketplace. Dispute resolution applications 814 provide mechanisms whereby disputes arising between transacting parties may be resolved. For example, the dispute resolution applications 814 may provide guided procedures whereby the parties are guided through a number of steps in an attempt to settle a dispute. In the event that the dispute cannot be settled via the guided procedures, the dispute may be escalated to a third party mediator or arbitrator.

A number of fraud protection applications 812 implement various fraud detection and prevention mechanisms to reduce the occurrence of fraud within the marketplace. Messaging applications 820 are responsible for the generation and delivery of messages to users of the network-based publication system 700, such messages for example may advise users regarding expected price of the listings the users are bidding for. The messaging applications 820 may also provide the users with price and popularity information related to similar listings (e.g., listings in the network-based publication system 700).

One or more expected price applications 816 may provide expected price for listings of interest to bidders in the network-based publication system 700. The expected price applications 816 may estimate the expected price based on the prices of similar listings.

A number of similar listings applications 822 may facilitate for bidders interested in a listing in the network-based publication system 700 to see the price and popularity information on one or more listings similar to the listing the bidder is interested in. The similar listings applications 822 may use algorithms, discussed above in description of FIGS. 5 and 6, to identify the similar listings, e.g., the listings published by the network-based publication system 700. The price and popularity applications 824 may support the expected price applications 816 and the messaging applications 820 in generating price and popularity information on the listings similar to the listing of interest to a user of the network-based publication system 700.

Example Machine Architecture

Figure 9:
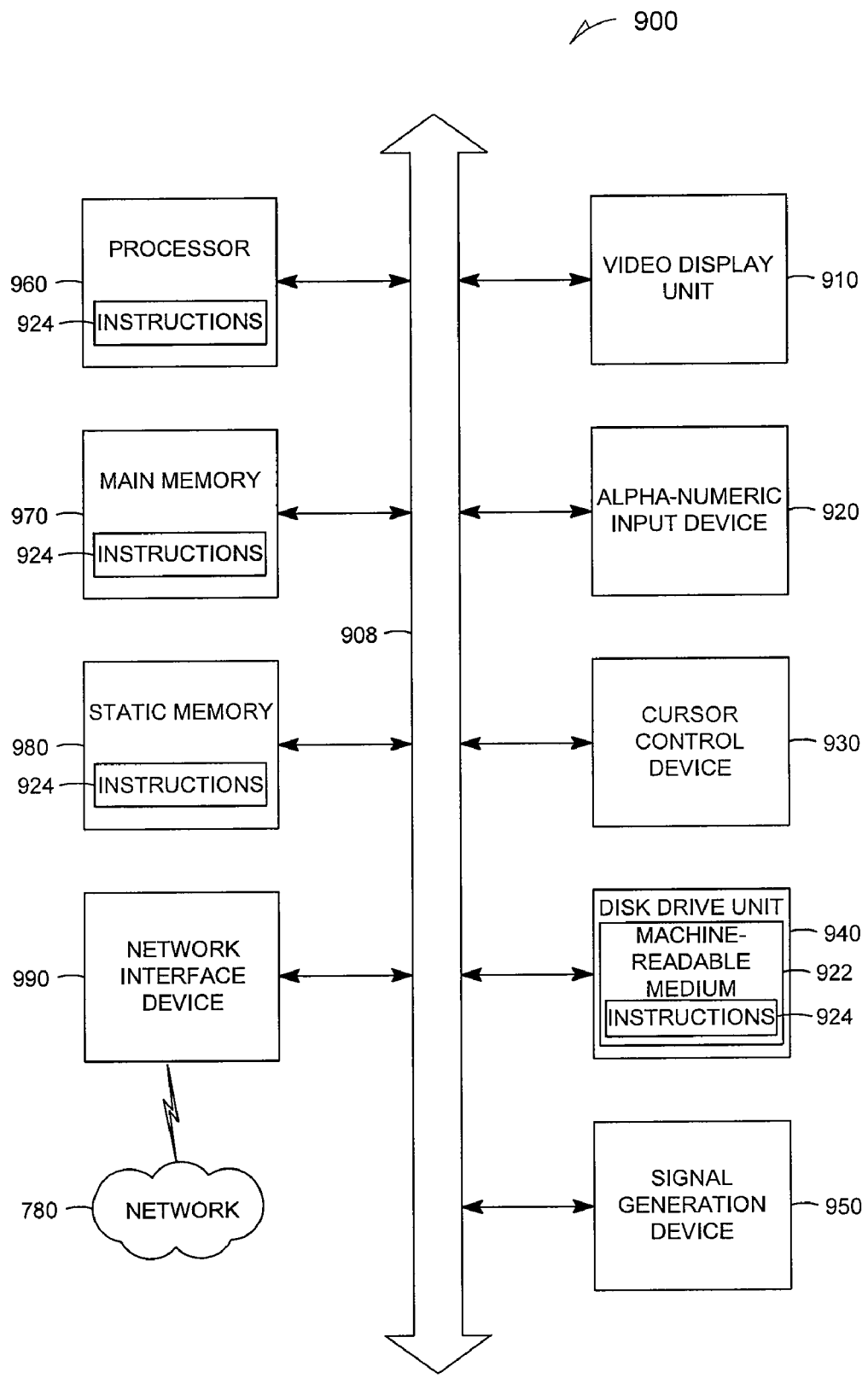
FIG. 9 is a block diagram illustrating a diagrammatic representation of a machine in the example form of a computer system.

FIG. 9 is a block diagram, illustrating a diagrammatic representation of machine 900 in the example form of a computer system within which a set of instructions for causing the machine to perform any one or more of the methodologies discussed herein may be executed. In alternative embodiments, the machine 900 may operate as a standalone device or may be connected (e.g., networked) to other machines. In a networked deployment, the machine 900 may operate in the capacity of a server or a client machine in a server-client network environment, or as a peer machine in a peer-to-peer (or distributed) network environment. The machine 900 may be a server computer, a client computer, a personal computer (PC), a tablet PC, a set-top box (STB), a Personal Digital Assistant (PDA), a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 may include a processor 960 (e.g., a central processing unit (CPU), a graphics processing unit (GPU) or both), a main memory 970 and a static memory 980, all of which communicate with each other via a bus 908. The computer system 900 may further include a video display unit 910 (e.g., liquid crystal displays (LCD) or cathode ray tube (CRT)). The computer system 900 also may include an alphanumeric input device 920 (e.g., a keyboard), a cursor control device 930 (e.g., a mouse), a disk drive unit 940, a signal generation device 950 (e.g., a speaker), and a network interface device 990.

The disk drive unit 940 may include a machine-readable medium 922 on which is stored one or more sets of instructions (e.g., software 924) embodying any one or more of the methodologies or functions described herein. The software 924 may also reside, completely or at least partially, within the main memory 970 and/or within the processor 960 during execution thereof by the computer system 900, the main memory 970 and the processor 960 also constituting machine-readable media.

The software 924 may further be transmitted or received over a network 780 via the network interface device 990.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories and optical and magnetic media.

Thus, a computerized method and system for merchandising for higher bids have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computerized method comprising:
   calculating an expected price for a first listing that has a title with one or more words by determining a plurality of sold listings similar to the first listing and averaging a plurality of prices at which the plurality of sold listings were sold,
   the determining of the plurality of sold listings including calculating a word weight by calculating a base-10 logarithm of a ratio of a first number of listings to a second number of listings that have titles that include a word in the title of the first listing,
   the calculating of the expected price being performed by a processor of a machine;
   receiving a proposed price for the first listing from a client machine, the proposed price being lower than the expected price calculated for the first listing from the plurality of prices at which the plurality of sold listings were sold; and
   in response to the receiving of the proposed price, conveying a message to the client machine that the proposed price is lower than the expected price calculated for the first listing, the message being conveyed with price and popularity information related to a second listing similar to the first listing.

2. The computerized method of claim 1, wherein the determining of the plurality of sold listings includes determining that the first listing has a tag and fetching the plurality of sold listings based on the tag, the plurality of sold listings each having the tag.

3. The computerized method of claim 2, wherein the tag is a catalog number shared in common by the first listing and each of the plurality of sold listings.

4. The computerized method of claim 2, further comprising determining the second listing based on the second listing having the tag shared in common with the first listing.

5. The computerized method of claim 1, wherein the determining of the plurality of sold listings includes determining that the first listing has no tag.

6. The computerized method of claim 1, wherein the first listing has a category; and the determining of the plurality of sold listings includes calculating a category weight based on the category of the first listing.

7. The computerized method of claim 6, wherein the calculating of the category weight includes calculating a further base-10 logarithm of a further ratio of a third number of listings to a fourth number of listings that have the category.

8. The computerized method of claim 1, wherein the determining of the plurality of sold listings is based on a total weight calculated by summing the word weight and a category weight, the word weight being calculated based on the word in the title of the first listing, the category weight being calculated based on a category of the first listing.

9. The computerized method of claim 1, further comprising determining the second listing based on a total weight calculated by summing the word weight and a category weight, the word weight being calculated based on the word in the title of the first listing, the category weight being calculated based on a category of the first listing.

10. A system comprising:

a similarity module configured to determine a plurality of sold listings as being similar to a first listing that has a title with one or more words, the determining of the plurality of sold listings including calculating a word weight by calculating a base-10 logarithm of a ratio of a first number of listings to a second number of listings that have titles that include a word in the title of the first listing;

a processor configured by an expected price module, the expected price module configuring the processor to calculate an expected price for the first listing by averaging a plurality of prices at which the plurality of sold listings were sold;

a user interface module configured to receive a proposed price for the first listing from a client machine, the proposed price being lower than the expected price calculated for the first listing from the plurality of prices at which the plurality of sold listings were sold; and a communication module configured to convey a message to the client machine that the proposed price is lower than the expected price calculated for the first listing, the message being conveyed in response to the receiving of the proposed price and with price and popularity information related to a second listing similar to the first listing.

11. The system of claim 10, wherein the similarity module is configured to determine that the first listing has a tag and fetch the plurality of sold listings based on the tag, the plurality of sold listings each having the tag.

12. The system of claim 11, wherein the similarity module is configured to determine the second listing based on the second listing having the tag shared in common with the first listing.

13. The system of claim 10, wherein the similarity module is configured to determine that the first listing has no tag.

14. The system of claim 10, wherein the first listing has a category; and the similarity module is configured to calculate a category weight based on the category of the first listing.

15. The system of claim 14, wherein the similarity module is configured to calculate the category weight by calculating a further base-10 logarithm of a further ratio of a third number of listings to a fourth number of listings that have the category.

16. The system of claim 10, wherein the similarity module is configured to determine the plurality of sold listings based on a total weight calculated by summing the word weight and a category weight, the word weight being calculated based on the word in the title of the first listing, the category weight being calculated based on a category of the first listing.

17. The system of claim 10, wherein the similarity module is configured to determine the second listing based on a total weight calculated by summing the word weight and a category weight, the word weight being calculated based on the word in the title of the first listing, the category weight being calculated based on a category of the first listing.

18. A system comprising:

means for determining a plurality of sold listings as being similar to a first listing that has a title with one or more words, the determining of the plurality of sold listings including calculating a word weight by calculating a base-10 logarithm of a ratio of a first number of listings to a second number of listings that have titles that include a word in the title of the first listing;

means for calculating an expected price for the first listing by averaging a plurality of prices at which the plurality of sold listings were sold;

means for receiving a proposed price for the first listing from a client machine, the proposed price being lower than the expected price calculated for the first listing from the plurality of prices at which the plurality of sold listings were sold; and means for conveying a message to the client machine that the proposed price is lower than the expected price calculated for the first listing, the message being conveyed in response to the receiving of the proposed price and with price and popularity information related to a second listing similar to the first listing.

19. The system of claim 18, wherein the means for determining the plurality of sold listings is further for determining that the first listing has a tag and for fetching the plurality of sold listings based on the tag, the plurality of sold listings each having the tag.

20. A non-transitory machine-readable medium comprising instructions that, when implemented by one or more processors of a machine, cause the machine to perform operations comprising:

calculating an expected price for a first listing that has a title with one or more words by determining a plurality of sold listings similar to the first listing and averaging a plurality of prices at which the plurality of sold listings were sold, the determining of the plurality of sold listings including calculating a word weight by calculating a base-10 logarithm of a ratio of a first number of listings to a second number of listings that have titles that include a word in the title of the first listing, the calculating of the expected price being performed by a processor of the machine;

receiving a proposed price for the first listing from a client machine, the proposed price being lower than the expected price calculated for the first listing from the plurality of prices at which the plurality of sold listings were sold;

in response to the receiving of the proposed price, conveying a message to the client machine that the proposed price is lower than the expected price calculated for the first listing, the message being conveyed with price and popularity information related to a second listing similar to the first listing.

\* \* \* \* \*

UNITED STATES PATENT AND TRADEMARK OFFICE
CERTIFICATE OF CORRECTION

PATENT NO. : 8,145,541 B2  
APPLICATION NO. : 11/961117  
DATED : March 27, 2012  
INVENTOR(S) : Sunil Mohan Page 1 of 1

It is certified that error appears in the above-identified patent and that said Letters Patent is hereby corrected as shown below:

In the Drawings:

On Sheet 1 of 9, Reference Numeral 110, Figure 1, line 2, Delete "SYSEM" and insert -- SYSTEM --, therefor.

In the Specifications:

In column 2, line 8, Delete "COPRPORATION" and insert -- CORPORATION --, therefor.

In column 2, line 27, Delete "auction" and insert -- auction. --, therefor.

In column 3, line 40, Delete "110)" and insert -- 110). --, therefor.

Signed and Sealed this
Third Day of July, 2012

David J. Kappos
*Director of the United States Patent and Trademark Office*